United States Patent Office 2,786,768
Patented Mar. 26, 1957

2,786,768

METHOD OF PRESERVING MEAT

Fred E. Deatherage, Columbus, Ohio

This invention is hereby dedicated to the Government of the State of Ohio for the free use of the People of the United States during the full term of the patent to be granted No Drawing. Application May 12, 1954, Serial No. 429,389

13 Claims. (Cl. 99—157)

This invention relates to food, its improvement, and preservation. More particularly, the invention relates to the treatment of meat whereby its quality and keeping properties are improved. The invention also includes the meat products so treated.

The preservation of meat in an edible condition following slaughter of the animal has been a problem of great economic significance for many years. Present day practices require that the carcass be chilled to an internal temperature below 60° F. within 20–24 hours after the animal is killed if internal spoilage is to be prevented. This requires the immediate availability of refrigeration, which increases the cost of the product and results in other disadvantages. Where refrigeration is not available, it is necessary to consume the meat within a very short period or suffer losses both in the meat and its quality.

Various investigations as to the cause of internal spoilage of meat have been undertaken with inconclusive results. In general, however, it has been found that deep spoilage of meat is the result of bacterial decomposition. Although normal muscle tissue is free of bacteria and is sterile, some incidences of pre-slaughter bacterial invasion unquestionably occur. In addition, experimental evidence shows that a large proportion of freshly-slightered animals are contaminated with a wide variety of bacteria, and it has been postulated that these are more often than not introduced into the tissue by way of the stick wound and are subsequently distributed throughout the circulatory system.

Studies that I have conducted on the nature of the infecting microorganisms have revealed the presence of at least 92 different species of bacteria of at least 12 different genera. These include both gram-positive and gram-negative organisms which can account for internal spoilage of the meat. The heterogeneous nature and wide distribution of these bacteria make control of meat spoilage a difficult problem.

It is known, of course, to preserve dead flesh by infusion of the vascular system with a strong disinfectant, such as formaldehyde or the like, but these render the flesh inedible and also tend to stop the desirable action of enzymes which normally act to tenderize the meat.

As a result of my studies, I have found that most of the contaminating bacteria are found in the lymph nodes of the vascular system and serve as foci for bacterial decomposition and spoilage of the meat. I have further discovered that the growth of these bacteria may be arrested and decomposition of the meat delayed for a substantial period of time by infusing throughout the vascular system of the animal, either immediately before or after bleeding, a broad spectrum antibiotic of the type and kind to be more particularly described hereinafter. As a result of this treatment, the flesh may be preserved at room temperatures for a greatly increased length of time without appreciable chance of spoilage. Perhaps equally as important is the fact that the flavor of the meat is unchanged, and the desirable aging process which is generally considered necessary to improve organoleptic properties takes place at higher temperatures than is presently practiced and is thereby accelerated so that flavorsome, tender, and well "aged" meat can be obtained in a few days. Thus, there is simultaneously obtained economic and organoleptic advantages.

The antibiotics that may be used to advantage in practicing the process of the present invention should have a number of common physical, chemical, physiological, and economic properties. A useful antibiotic should have as wide a bacterial spectrum as possible and be able to inhibit the growth of the bacteria that are generally encountered in spoiled meat. It should, of course, be non-toxic and not adversely affect the color or taste. The antibiotic should be relatively stable under conditions found in meat which has a pH ranging from around 5.4 to 6.6. On the other hand, it is a desirable property that the antibiotic disappear from the tissue by natural decomposition after a short period of time so that when consumed no substantial amount of the material remains. As a practical matter, the amount of antibiotic used in the process is so small that residual amounts present no particular problem, and in addition, most of the antibiotics that are suitable for use in the process of the present invention decompose as the meat is cooked. The antibiotic should also be water soluble to the extent that the quantities which are necessary for treatment can be introduced into the vascular system. Obviously, it should be inexpensive but so little of it is used in practice that expense is a minor consideration when compared with the advantages gained.

Preferred antibiotics for use in the present invention are those of the tetracycline series, including chlortetracycline, bromotetracycline, oxytetracycline, and tetracycline itself. Of these, chlortetracycline appears to have the most desirable properties and meets the most important requirements of the process.

Other wide spectrum antibiotics such as chloramphenicol may also be used to practice the present invention. In view of the nature of the infecting organisms that have been identified mixtures of antibiotics having a narrower antibacterial spectra than the preferred ones mentioned above may be used. Antibiotics such as penicillin, bacitracin, erythromycin, and magnamycin are known to be effective against Gram positive bacteria, whereas antibiotics such as polymyxin, streptomycin, and neomycin are noted for their activity against Gram negative bacteria. Combinations of these antibiotics such as streptomycin and penicillin, streptomycin and bacitracin, polymyxin and penicillin, penicillin and neomycin, and the like may be used to inhibit internal bacterial decomposition caused by microorganisms sensitive to these antibiotics. Of course, this does not preclude the use of other antibiotics such as neomycin or streptomycin with chlortetracycline. It is also pointed out that in some few instances synergistic action is obtained as a result of combinations of different antibiotics, and this increased activity may be taken advantage of by using solutions of such mixed antibiotics in practicing the process described and claimed herein.

The process of the present invention finds its greatest utility in the treatment of beef, although it can be used to advantage in the preservation and improvement of the meat of swine, horses, goats, sheep, and other animals whose flesh is preserved and eaten as well as poultry, such as chickens, turkeys, ducks, and the like. The term "meat" as used herein is intended to encompass the flesh of all of these various animals.

The introduction of the antibiotic into the vascular system of the animal may be accomplished in a variety of ways. If desired, the antibiotic can be introduced into the blood stream of the animal immediately prior to slaughter by intravenous injection or oral administration, depending upon the nature of the antibiotic and the animal. Alternatively, the antibiotic may be introduced into the vascular system after slaughter by cannulation of the vascular system so that the antibiotic is infused throughout the animal while its circulatory system is essentially intact, preferably while the animal is still warm.

The antibiotic may also be introduced into particular parts of the animal which have been broken down by the butcher. In such cases, syringes or pressure pumps may be used in conjunction with the use of hemostats to avoid loss of the treating solution.

Ordinarily, in the case of cattle, the preferred procedure would be to stun the animal, open the neck, expose the carotid arteries and bleed the animal by severing the jugular vein. The solution is then injected into the carotid arteries by some suitable device such as the Griffith pump, operating at a pressure of about 5 pounds per square inch or normal blood pressure of the animal. If the infusion process is not carried out immediately, higher pressures may be necessary.

The amount of antibiotic used in the process should be such that at least about 2 parts per million, by weight, of the antibiotic based on the weight of the treated animal remains in the carcass. The upper limit may vary considerably, up to perhaps 50 parts per million or even more of the antibiotic. However, factors such as expense, taste, toxicity, color, and the like will tend to keep the amount of antibiotic remaining in the flesh close to the minimum amount of from about 2 to 10 parts per million, depending upon the antibacterial potency of the antibiotic that is used.

If the antibiotic is introduced into the blood stream of the animal before it is slaughtered, the concentration of the antibiotic in the blood stream will be made such that the minimum of at least 2 parts per million by weight of the whole animal will result after the blood is drawn on slaughtering. Relationship of blood volume to tissue will, of course, vary somewhat from animal to animal and specie to specie. When using an infusion solution, it should contain about 25 to 100 parts per million of the antibiotic, preferably 50 to 60 parts per million of chlortetracycline, when the slaughtered animal is infused with one blood volume of infusing solution. It will be understood, of course, that after the infusion process, most of this solution may be allowed to drain from the vascular system. Under other conditions, it may be desirable to infuse the animal with a solution amounting in volume to less than the normal blood volume of the animal. For example, a desirable embodiment of the invention would be to infuse the vascular system of the freshly bled animal with about one-third blood volume of an aqueous solution containing approximately 150 to 200 parts per million of antibiotic. This concentration is preferred with the tetracyclines, although with less effective antibiotics, the solution should contain more.

Although simple aqueous solutions of antibiotic may be introduced into the vascular system of the slaughtered animal, it is preferred that the solution contain isotonic amounts of salt, approximately 0.9 percent by weight. Under some conditions other chemical agents, such as buffers to control the pH and/or color of the flesh may be used. However, as these may modify the appearance of the viscera, such agents are not presently preferred.

It is noted that in connection with the practice of introducing the antibiotic into the vascular system of the animal while it is yet alive, there is the advantage that the heart will act as a pump to distribute the antibiotic uniformly throughout the animal tissue, thus obtaining an effective distribution. When the animal is killed by the conventional process called sticking, approximately two-thirds of the volume of the blood is removed. This is to be taken into account in calculating the blood levels of antibiotic and should be present at the time the animal is slaughtered.

It will be understood, of course, that the various salts of the antibiotics mentioned before as being useful in the process can be used when they possess antibacterial activity. Also mixtures of antibiotics particularly to increase the antibacterial spectra of the composition may be used if desired, although the cost of the antibiotic treatment may be increased as a result. These modifications are intended to be included within the purview of the invention.

Further details concerning the conditions, advantages, and results of the process of the present invention may be found in publications by myself and coworkers, for example, "Studies on meat. IV. The use of antibiotics in preservation of fresh beef," by Goldberg, Weiser, and Deatherage, Food Technology, 1953, vol. VII, No. 4, pages 165–166, and "Observations on fresh meat processed by the infusion of antibiotics," by Weiser, Goldberg, Cahill, Kunkle, and Deatherage, Food Technology, 1953, vol. VII, No. 12, pages 495–499.

To illustrate particular embodiments of the invention, a number of examples dealing with different aspects of the process will be given.

EXAMPLE I

For this work 7 less expensive lower grade animals were used. They ranged in weight from 700 to 1250 pounds.

The animal was stunned by a blow on the head in the usual manner and then shackled. The neck was opened along the mid-line exposing the carotid arteries. These were closed by hemostats and partially severed between the aorta and hemostat along with complete cutting of the jugular veins. The animal was hoisted momentarily to facilitate bleeding. Next the animal was placed on the pritch bed and one carotid artery was cannulated using a 10 mm. tube attached to a Griffith pump by rubber connection. The maximum output of the pump was less than the heart output of the animal. Even so it was possible to infuse the animal without excessive pressure and complete it in about 15 minutes.

The solution injected consisted of physiological saline made with 30 pounds of sterile tap water in which 0.75 g. chlortetracycline was dissolved. All equipment used had previously been sterilized with live steam. The resulting solution contained 55 parts per million of the antibiotic. 10 percent of the weight of the animal was the amount of aureomycin in saline which was infused. The completeness of the infusion could be seen simply by opening the skin at the shank and at the mid-line above the sternum and also by observing the effluent from the severed veins.

After the infusion the animal was dressed in the usual manner. Although at dressing the skeletal muscle appeared normal, the viscera showed some altered appearances due to flushing out of the blood residues. Since the flow of the infusate was through the aorta to the tissues and back to the vena cava and out the jugular vein, the heart appeared pale and at times the lungs were only slightly altered in appearance. In one or two instances the lungs were also flushed out.

The carcasses were split in the usual manner and shrouded. One side was immediately chilled out in the customary manner, whereas the other was allowed to stay at room temperature for 48 hours prior to chilling. The sides were studied for bacterial populations and chlortetracycline residues in different tissues and the meat was tested for tenderness, for moisture and total nitrogen.

In all 7 animals no flavor differences were noted, which could be attributed to the infusion of the antibiotic. No adverse color or paleness resulted. However, there was an unexpected color improvement in some of the treated sides where refrigeration was delayed. The eating quality of the meat was quite satisfactory, and it was observed that steaks cut from sides which had been allowed to stay at room temperature for 48 hours prior to chilling were definitely tenderer than those which had been immediately refrigerated according to conventional practices. The bacterial count in both sides remained satisfactory.

EXAMPLE II

In another series of experiments beef animals were slaughtered and dressed in the usually accepted manner. After splitting the carcasses the hot rounds were excised and used immediately. One round was infused while the other remained a control. The infusion was carried out using a Griffith pump such as is used for ham curing. A 10-gauge needle was used to cannulate the external iliac artery. Since an excised round has its vascular system cut in numerous places, somewhat elevated pressures were required to overcome leaking vessels (arteries) which could not be closed handily using hemostats. The injection solution was the same as was described in Example I. The round was pumped to a 10 percent increase in weight. At this time the hemostats were removed, and the round was drained. Six to 7.5 percent of the original weight was retained. In order to be assured of complete infusion pressure was applied so that swelling of the knuckle and shank as well as the top of the round could be observed. The pressure was considerably more than normal blood pressure and there was some rupture of the small vessels. Both control and infused rounds were treated alike as far as refrigeration was concerned.

Eight paired rounds were placed immediately into a cooler at 3° C. for 48 hours. After this time the control and infused rounds were examined in detail. Both rounds were comparable in color, odor, taste, and pH, although the infused round appeared a bit more moist. The popliteal lymph nodes were examined for bacteria with the following results (Table 1). (In this table 30 indicates no organisms were found and the lower limit of counting was 30/g.) These data clearly indicated that the antibiotic was effective in reducing the bacterial populations in these nodes.

Table 1

Bacteria in the popliteal lymph nodes from infused and control paired rounds held in 3° C. cooler 48 hours post mortem.

| Round No. | Number of organisms per gram | |
|---|---|---|
| | Infused | Control |
| 1 | 30 | 30 |
| 2 | 400 | 6,000 |
| 3 | 30 | 30 |
| 4 | 30 | 450 |
| 5 | 30 | 1,000 |
| 6 | 30 | 1,600 |
| 7 | 30 | 1,500 |
| 8 | 30 | 2,000 |

In a second series of similar tests the rounds were kept at room temperature (which was 75 to 85° F.) for 48 hours. The rounds darkened on the surface and if they didn't sour, they were comparable in appearance and flavor. The bacterial counts on these rounds are shown in Table 2.

Table 2

Bacteria in the popliteal lymph nodes, top round, and knuckle from infused and control paired rounds held at room temperature 25°–30° C. 48 hours post mortem.

| Round No. | Thousands of Bacteria/gram | | | | | |
|---|---|---|---|---|---|---|
| | Lymph nodes | | Top round | | Knuckle | |
| | Control | Infused | Control | Infused | Control | Infused |
| 9 | 120 | 0.6 | 910 | 3 | 6,000 | 10 |
| 10 | 10 | 0.3 | 1,000 | 13 | 3,000 | 32 |
| 11 | 270 | 100 | 90 | 20 | 100 | 61 |
| 12 | 165 | 55 | 200 | 26 | 150 | 48 |
| 13 | 21,000 | 130 | 43 | 0.8 | 400 | 4.2 |
| 14 | 930 | 10 | 370 | 12 | 175 | 40 |
| 15 | 1,000 | 6.3 | 450 | 10 | 500 | 36 |
| 16 | 100 | 8.0 | 12 | 1.7 | 20 | 5 |
| 17 | 77 | 5.6 | 500 | 3 | 750 | 15 |
| 22 | 12,000 | 20 | 12,000 | 4 | 12,000 | 12 |

Seven out of 10 control rounds exhibited some or at least a little off odor at some point. However, all of the infused rounds were sound. Control rounds 13, 15 and 22 were sour.

To determine the stability of chlortetracycline in infused beef, a number of experiments were run similar to those described above and the chlortetracycline remaining in the meat was determined from time to time. It was found that in the case of beef which had been held at room temperature for 2 days and then placed under refrigeration, a preferred embodiment of the invention, the residual chlortetracycline decreased to a level of less than about 1 part per million at the end of 4 days. This is an advantage of the invention in that while the chlortetracycline has remained in contact with such infecting bacteria as may have been present for sufficient period of time to render them harmless, yet the disappearance of the chlortetracycline by natural processes of decomposition obviates the public health problem of providing a product for consumption containing significant quantities of antibiotic.

As noted above, chlortetracycline appears to be the antibiotic of choice in the practice of the present invention because of the desirable qualities illustrated in the specific examples. It will be understood, however, that other broad spectrum antibiotics and mixtures of antibiotics of the type discussed herein may also be used for the purposes of the present invention.

Another advantage of the invention which is not readily apparent is its possible use in the control of such infectious diseases as foot and mouth disease. The meat of animals suffering from this viral infection is considered edible but Government regulations forbid the transportation of such meat from the place of origin on account of the possibility that the virus will be spread to previously uninfected areas. Although virus bodies require living substrate for propagation, yet it is believed that under refrigerated conditions the virus may remain viable and transported meat may be a vector of transmission of the disease. If, however, the meat after infusion with a broad spectrum antibiotic as described herein is allowed to hang at room temperature for a few days, it will be found that the infectivity of the virus is lost. The meat may then be shipped without danger of spreading the viral infection. The foregoing may also apply to meat infected with other viral and Rickettsial agents.

I claim:

1. A method of preserving meat which comprises the step of introducing into the vascular system of the animal at a time near its slaughter 2 to 50 parts per million based on the weight of the animal a broad spectrum antibiotic effective against both Gram positive and Gram negative bacteria.

2. A method of preserving meat which comprises the step of introducing into the vascular system of the animal at a time near its slaughter 2 to 50 parts per million based on the weight of the animal a broad spectrum antibiotic of the tetracycline series.

3. A method of preserving meat which comprises the step of introducing into the vascular system of the animal at a time near its slaughter 2 to 50 parts per million based on the weight of the animal a mixture of antibiotics, said mixture being effective against both Gram positive and Gram negative bacteria at least one of said antibiotics being of the tetracycline series.

4. A process of preserving meat which comprises the steps of injecting into the vascular system of the animal immediately prior to slaughter a broad spectrum antibiotic effective against both Gram-positive and Gram-negative bacteria such that the concentration thereof in the blood stream is within the range of about 25–100 parts per million by weight.

5. A method of preserving meat which comprises injecting into the vascular system of the animal after bleeding while the vascular system is essentially intact an aqueous solution containing between about 25–100 parts per million of broad spectrum antibiotic effective against both Gram-postive and Gram-negative bacteria.

6. A method of preserving meat which comprises injecting into the vascular system of the animal after bleeding while the vascular system is essentially intact an aqueous solution containing between about 25–100 parts per million of chlortetracycline.

7. A method of preserving meat which comprises injecting into the vascular system of the animal after bleeding while the vascular system is essentially intact an aqueous solution containing between about 25–100 parts per million of tetracycline.

8. A method of preserving meat which comprises injecting into the vascular system of the animal after bleeding while the vascular system is essentially intact an aqueous solution containing between about 25–100 parts per million of oxytetracycline.

9. A method of preserving meat which comprises injecting into the vascular system of the animal after bleeding while the vascular system is essentially intact an aqueous solution containing between about 25–100 parts per million of chloramphenicol.

10. A method of preserving meat which comprises injecting into the vascular system of the animal after bleeding while the vascular system is essentially intact an aqueous solution containing between about 25–100 parts per million of a mixture of antibiotics effective against both Gram positive and Gram negative bacteria at least one of said antibiotics being of the tetracycline series.

11. A method of preserving and quick aging meat which comprises the steps of bleeding the animal, injecting into the vascular system thereof an aqueous solution containing a broad spectrum antibiotic of the group consisting of tetracycline, chlortetracycline, bromtetracycline, oxytetracycline, and chloramphenicol in such quantity and concentration that after drainage thereof there will remain in the flesh at least about 2 parts per million by weight of the antibiotic based on the weight of the animal, allowing the meat to hang at approximately room temperatures for a period of from 1–4 days while allowing natural occurring enzymes of the flesh to effect a tenderizing action on the meat.

12. A method of preserving and quick aging meat which comprises the steps of bleeding the animal, injecting into the vascular system thereof an aqueous solution containing chlortetracycline in such quantity and concentration that after drainage thereof there will remain in the flesh at least about 2 parts per million by weight of the antibiotic based on the weight of the animal, allowing the meat to hang at approximately room temperatures for a period of from 1–4 days while allowing naturally occurring enzymes of the flesh to effect a tenderizing action on the meat.

13. A method of preserving and quick aging meat which comprises the steps of bleeding the animal, injecting into the vascular system thereof an aqueous solution containing tetracycline in such quantity and concentration that after drainage thereof there will remain in the flesh at least about 2 parts per million by weight of the antibiotic based on the weight of the animal, allowing the meat to hang at approximately room temperatures for a period of from 1–4 days while allowing natural occurring enzymes of the flesh to effect a tenderizing action on the meat.

References Cited in the file of this patent

UNITED STATES PATENTS

| | | |
|---|---|---|
| 22,185 | Marsh | Nov. 30, 1858 |
| 2,585,501 | Rusoff | Feb. 12, 1952 |

OTHER REFERENCES

"Food Industries," October 1950, page 126, article entitled "Antibotics Effectively Retard Bacterial Spoilage of Fish."

"Science News Letter," December 9, 1950, page 376, article entitled "Terramycin Puts Extra Pounds on Pigs."

"Food Technology," September 1952 pages 363 to 366, inclusive, article entitled "Experimental Preservation of Flesh Foods with Antibiotics."

"Drug Trade News," July 6, 1953, Manufacturing Section, page 48, article entitled "Report Antibiotic Infusions May Preserve Meats."

"Food Engineering," August 1953, page 184, article entitled "Aureo, Oleo, and C. Rays for Better Meats, Fish."

"Chemical and Engineering News," September 28, 1953, page 3960, article entitled "Antibiotics in Meat Processing."

"Manufacturing Chemist," March 1954, page 116, article entitled "Tetracycline."